United States Patent
Shima (10) Patent No.: US 7,440,835 B2
(45) Date of Patent: Oct. 21, 2008

(54) VEHICLE CRUISE CONTROL SYSTEM

(75) Inventor: Takashi Shima, Ebina (JP)

(73) Assignee: Nissan Motor Co., Ltd., Yokohama (JP)

( * ) Notice: Subject to any disclaimer, the term of this patent is extended or adjusted under 35 U.S.C. 154(b) by 198 days.

(21) Appl. No.: 11/178,412

(22) Filed: Jul. 12, 2005

(65) Prior Publication Data

US 2006/0015240 A1 Jan. 19, 2006

(30) Foreign Application Priority Data

Jul. 16, 2004 (JP) .............................. 2004-209972

(51) Int. Cl.
*B60T 8/32* (2006.01)

(52) U.S. Cl. .............................. 701/93; 701/94; 701/95; 701/96; 701/301; 701/70; 180/169; 180/170

(58) Field of Classification Search .................... 701/93, 701/94
See application file for complete search history.

(56) References Cited

U.S. PATENT DOCUMENTS

| | | | | |
|---|---|---|---|---|
| 4,870,583 | A * | 9/1989 | Takahashi et al. ............. | 701/93 |
| 5,230,400 | A * | 7/1993 | Kakinami et al. ............ | 180/169 |
| 5,839,534 | A * | 11/1998 | Chakraborty et al. ....... | 180/169 |
| 5,979,582 | A * | 11/1999 | Håkansson et al. .......... | 180/170 |
| 6,161,072 | A * | 12/2000 | Clapper ........................ | 701/93 |
| 6,226,588 | B1 * | 5/2001 | Teramura et al. ............. | 701/93 |
| 6,360,158 | B1 * | 3/2002 | Hanawa et al. ............... | 701/93 |
| 6,370,470 | B1 * | 4/2002 | Yamamura et al. ........... | 701/96 |
| 6,405,119 | B1 * | 6/2002 | Linden ......................... | 701/95 |
| 6,769,504 | B2 * | 8/2004 | Kobayashi et al. .......... | 180/169 |
| 6,836,719 | B2 * | 12/2004 | Andersson et al. ........... | 701/93 |
| 7,151,993 | B2 * | 12/2006 | Terada .......................... | 701/93 |
| 2004/0010362 | A1 * | 1/2004 | Michi et al. .................... | 701/93 |
| 2005/0004743 | A1 * | 1/2005 | Kojima et al. ................. | 701/96 |
| 2005/0055150 | A1 * | 3/2005 | Uhler et al. ................... | 701/93 |
| 2005/0216162 | A1 * | 9/2005 | Suzuki et al. ................. | 701/70 |
| 2005/0216169 | A1 * | 9/2005 | Arai ............................. | 701/96 |
| 2005/0267684 | A1 * | 12/2005 | Kawakami et al. .......... | 701/301 |
| 2005/0273262 | A1 * | 12/2005 | Kawakami et al. .......... | 701/301 |
| 2006/0015241 | A1 * | 1/2006 | Shima .......................... | 701/96 |
| 2006/0052926 | A1 * | 3/2006 | Okada et al. .................. | 701/51 |
| 2006/0100769 | A1 * | 5/2006 | Arai et al. ..................... | 701/96 |
| 2007/0142994 | A1 * | 6/2007 | Boecker et al. ............... | 701/93 |

FOREIGN PATENT DOCUMENTS

| | | |
|---|---|---|
| DE | 10218017 A1 | 11/2003 |
| DE | 10254582 A1 | 6/2004 |
| EP | 1-075-978 A | 2/2001 |
| JP | 2002-234358 A | 8/2002 |
| JP | 2002/234358 A | 12/2002 |

* cited by examiner

*Primary Examiner*—Thomas G. Black
*Assistant Examiner*—Wae Louie
(74) *Attorney, Agent, or Firm*—Global IP Counselors, LLP (57) ABSTRACT

A vehicle cruise control system is provided that comprises a vehicle speed detecting section, a cruise control section, and a cruising speed setting section. The vehicle speed detecting section is configured and arranged to detect a speed of a host vehicle. The cruise control section is configured to execute a first prescribed cruise control such that the host vehicle travels in a constant-speed state at a cruising speed setting when the host vehicle is traveling in a first prescribed speed region. The cruising speed setting section is configured to set the cruising speed setting when the host vehicle is traveling in a vehicle speed region other than the first prescribed speed region.

20 Claims, 5 Drawing Sheets

VEHICLE CRUISE CONTROL SYSTEM

CROSS-REFERENCE TO RELATED APPLICATIONS

This application claims priority under 35 U.S.C. § 119 to Japanese Patent Application No. 2004-209972. The entire disclosure of Japanese Patent Application No. 2004-209972 is hereby incorporated herein by reference.

BACKGROUND OF THE INVENTION

1. Field of the Invention

The present invention relates to a vehicle cruise control system.

2. Background Information

Japanese Laid-Open Patent Publication No. 2002-234358 discloses a conventional preceding vehicle following cruise control system in a total range of vehicle speeds (0 to 100 km/h) in which a preceding vehicle following cruise control (i.e., a following cruise control) is executed is divided into a plurality of vehicle speed regions. The conventional preceding vehicle following cruise control system is configured to execute the following cruise control so that a host vehicle follows a preceding vehicle in a manner corresponding to the vehicle speed region in which the host vehicle is traveling.

In view of the above, it will be apparent to those skilled in the art from this disclosure that there exists a need for an improved vehicle cruise control system. This invention addresses this need in the art as well as other needs, which will become apparent to those skilled in the art from this disclosure.

SUMMARY OF THE INVENTION

It has been discovered that in the conventional preceding vehicle following cruise control system described above, the vehicle speed regions are set such that adjacent vehicle speed regions overlap with each other. The conventional preceding vehicle following cruise control system is configured to shift to the following cruise control for a higher speed region between the adjacent vehicle speed regions when a prescribed switch is operated while the vehicle is in the overlapping region. After the following cruise control is shifted for the higher speed region by operating the prescribed switch, the prescribed switch must be operated again in a continuous manner to raise a cruising speed setting used for the following cruise control in the high speed region. Thus, the switch operations required in order to accomplish both shifting to the higher speed region and setting the cruising speed setting to the desired value are complicated in the conventional preceding vehicle following cruise control system.

Also, with the conventional preceding vehicle following cruise control system described above, when the following cruise control is not being executed (e.g., stand by mode) and the vehicle is traveling in the high speed region, the following cruise control is started when the prescribed switch is operated. After the prescribed switch is operated to start the following cruise control in the high speed region, the prescribed switch must be operated again in a continuous manner to raise the cruising speed setting used for the following cruise control in the high speed region to the desired speed. Thus, the switch operations required in order to accomplish both starting the following cruise control and setting the cruising speed setting to the desired value are complicated in the conventional preceding vehicle following cruise control system.

Accordingly, one object of the present invention is to provide a vehicle cruise control system in which operability with respect to shifting between vehicle speed regions is improved.

In order to achieve the above mentioned object and other objects of the present invention, a vehicle cruise control system is provided that comprises a vehicle speed detecting section, a cruise control section, and a cruising speed setting section. The vehicle speed detecting section is configured and arranged to detect a speed of a host vehicle. The cruise control section is configured to execute a first prescribed cruise control such that the host vehicle travels in a constant-speed state at a cruising speed setting when the host vehicle is traveling in a first prescribed speed region. The cruising speed setting section is configured to set the cruising speed setting when the host vehicle is traveling in a vehicle speed region other than the first prescribed speed region.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the vehicle cruise control system in accordance with a first embodiment of the present invention, a total range of vehicle speeds in which a preceding vehicle following cruise control (i.e., the following cruise control) is executed is divided into two regions, i.e., a low speed region and a high speed region. The vehicle cruise control system is configured to selectively execute a following cruise control mode for the low speed region (hereinafter called "low speed following cruise control mode") and a following cruise control mode for the high speed region (hereinafter called "high speed following cruise control mode") so that the following cruise control is executed in all speed regions of the total range of vehicle speeds. The "total range of vehicle speeds" as used herein means a substantially entire range of vehicle speeds that ranges from a minimum vehicle speed at which the following cruise control is executed to a maximum vehicle speed at which the following cruise control is executed. For example, the minimum vehicle speed of the total range of vehicle speeds is set to 0 km/h or a very low speed (e.g., 10 km/h), and the maximum vehicle speed of the total range of vehicle speeds is set to a legal speed limit (e.g., 100 km/h) or a higher speed.

In the vehicle cruise control system of the present invention, the low speed following cruise control mode is used in the low speed region that ranges from the minimum vehicle speed (e.g., 10 km/h in the first embodiment) of the total range of vehicle speeds to an upper speed limit (e.g., 40 km/h in the first embodiment) for the low speed following cruise control mode. In the low speed following cruise control mode, the vehicle cruise control system is configured to execute the preceding vehicle following cruise control such that a vehicle in which the vehicle cruise control system is installed (hereinafter referred as "host vehicle") follows a preceding vehicle while maintaining a preset following distance (second prescribed following distance) when the preceding vehicle is detected in front of the host vehicle, and to abort the preceding vehicle following cruise control if the preceding vehicle ceases to be detected or is not detected in front of the vehicle.

On the other hand, the high speed following cruise control mode is also called an adaptive cruise control (ACC) mode, and is used in a high speed region that ranges from a lower speed limit (e.g., 40 km/h in the first embodiment) for the high speed following cruise control mode to the maximum vehicle speed (e.g., 110 km/h in the first embodiment) of the total range of vehicle speeds. In the high speed following cruise control mode, the vehicle cruise control system is configured to execute the preceding vehicle following cruise control in which one of a constant speed cruise control and the following cruise control is executed depending on whether the preceding vehicle is detected. More specifically, the vehicle cruise control system is configured to execute the constant speed cruise control such that the host vehicle travels in a constant-speed state at a cruising speed that has been set (hereinafter called "cruising speed setting") for the high speed following cruise control mode when the preceding vehicle is not detected in front of the host vehicle, and to execute the following cruise control such that the host vehicle follows the preceding vehicle while maintaining a preset following distance (first prescribed following distance) and not exceeding the cruising speed setting when the preceding vehicle is detected. In other words, the cruising speed setting is used as an upper speed limit during the following cruise control in the high speed following cruise control mode.

A driver of the host vehicle can set the cruising speed setting for the high speed following cruise control mode to any desired speed between the lower speed limit (e.g., 40 km/h in the first embodiment) of the high speed following cruise control mode and the maximum vehicle speed (e.g., 110 km/h in the first embodiment) of the total range of vehicle speeds at which the preceding vehicle following cruise control is executed. In the first embodiment of the present invention, the upper speed limit of the low speed following cruise control mode and the lower speed limit of the high speed following cruise control are both 40 km/h such that the total range of vehicle speeds at which preceding vehicle following cruise control is executed is divided at 40 km/h into two regions, i.e., the high speed region and the low speed region. Of course, it will be apparent to those skilled in the art from this disclosure that it is also acceptable to define the low speed region and the high speed region such that they overlap each other. For example, the low speed region can be set to range from 10 to 40 km/h and the high speed region can be set to range from 35 km/h to 110 km/h.

As explained above, in the first embodiment, the total range of vehicle speeds at which the preceding vehicle speed following cruise control is executed is divided into two vehicle speed regions (i.e., the high speed region and the low speed region). However, it will be apparent to those skilled in the art from this disclosure that it is also acceptable to divide the total range of vehicle speeds into three or more regions and configure the vehicle cruise control system to execute a unique preceding vehicle following cruise control in each vehicle speed region.

Figure 1:
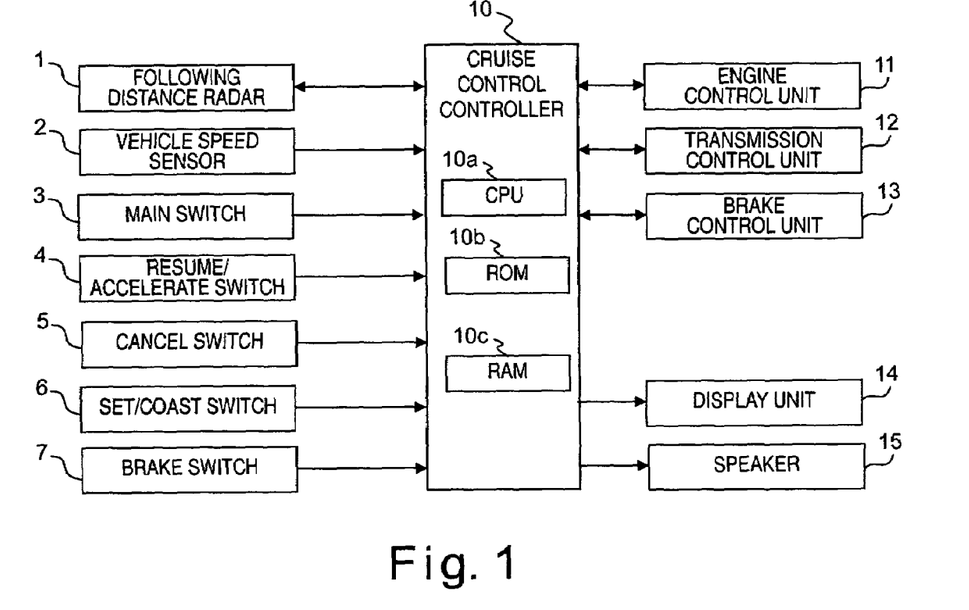
FIG. 1 is a block diagram illustrating constituent features of a vehicle cruise control system in accordance with a first embodiment of the present invention.

FIG. 1 is a block diagram illustrating constituent components of the vehicle cruise control system in accordance with the first embodiment. As seen in FIG. 1, the vehicle cruise control system of the first embodiment has a cruise control controller 10 that is operatively coupled to various sensors and switches including a following distance radar 1, a vehicle speed sensor 2, a main switch 3, a resume/accelerate switch 4, a cancel switch 5, a set/coast switch 6 and a brake switch 7. The cruise control controller 10 is also operatively coupled to an engine control unit 11, a transmission control unit 12, a brake control unit 13, a display unit 14 and a speaker 15.

The following distance radar 1 is configured and arranged to sweep a laser beam in front of the host vehicle to detect a preceding vehicle and to detect a distance from the host vehicle to the preceding vehicle (i.e., the following distance). Alternatively, a milliwave following distance radar that uses milliwaves can be used for the following distance radar 1 to detect the following distance instead of a laser beam radar. The vehicle speed sensor 2 is configured and arranged to detect a traveling speed of the host vehicle. The main switch 3 is an operating member for starting the preceding vehicle following cruise control system. When the main switch 3 is on, power is being supplied to the vehicle cruise control system. The resume/accelerate switch 4 is an operating member used to resume the preceding vehicle following cruise control at the same cruising speed setting as was previously used or to increase the cruising speed setting. More specifically, if the preceding vehicle following cruise control is not in progress when the resume/accelerate switch 4 is operated, the preceding vehicle following cruise control is resumed using the cruising speed setting for the high speed following cruise control mode that was used the previous time the preceding vehicle following cruise control was executed. On the other hand, if the preceding vehicle following cruise control is in progress when the resume/accelerate switch 4 is operated, the cruising speed setting for the high speed following cruise control mode is increased.

The cancel switch 5 is an operating member for canceling the preceding vehicle following cruise control. The set/coast switch 6 is an operating member used to start the preceding vehicle following cruise control when the preceding vehicle following cruise control is not already in progress and used to reduce the cruising speed setting for the high speed following cruise control mode when the preceding vehicle following cruise control is already in progress. When the set/coast switch 6 is operated while the preceding vehicle following cruise control is not in progress, the preceding vehicle following cruise control starts if the preceding vehicle is detected and the constant speed cruise control starts if the preceding vehicle is not detected in the high speed region. As mentioned above, the constant speed cruise control is configured to control the host vehicle to travel at the cruising speed setting for the high speed following cruise control mode. The resume/accelerate switch 4, the cancel switch 5, and the set/coast switch 6 are preferably provided on a spoke portion of the steering wheel (not shown) of the host vehicle so that a driver of the host vehicle can operate the resume/accelerate switch 4, the cancel switch 5, and the set/coast switch 6 while sitting on a driver's seat. The brake switch 7 is turned on when the brake pedal (not shown) is depressed.

The cruise control controller 10 preferably includes a microcomputer with the preceding vehicle following cruise control program and the constant speed cruise control program described above to control the vehicle cruise control system as discussed below. More specifically, as seen in FIG. 1, the cruise control controller 10 includes a CPU 10a, a ROM (Read Only Memory) 10b, and a RAM (Random Access Memory) 10c. The cruise control controller 10 can also include other conventional components such as an input interface circuit, an output interface circuit, and the like. The microcomputer of the cruise control controller 10 is programmed to control the preceding vehicle following cruise control. The memory circuit stores processing results and control programs such as ones for the preceding vehicle following cruise control operation that are run by the processor circuit. The cruise control controller 10 is operatively coupled to the various sensors and switches in a conventional manner. The internal RAM 10c of the cruise control controller 10 stores statuses of operational flags and various control data. The internal ROM 10b of the cruise control controller stores the various data and maps for various operations. The cruise control controller 10 is capable of selectively controlling any of the components of the vehicle cruise control system in accordance with the control program. It will be apparent to those skilled in the art from this disclosure that the precise structure and algorithms for the cruise control controller 10 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

The engine control unit 11 is configured to execute air intake quantity control, fuel injection control, and ignition timing control of an engine (not shown) to regulate the output torque and the rotational speed of the engine and to control the drive force of the host vehicle. The transmission control unit 12 is configured to control the gear ratio, i.e., shift position, of an automatic transmission (not shown) of the host vehicle. The brake control unit 13 is configured to control the braking force of the host vehicle by adjusting the brake fluid pressure.

The display unit 14 is configured and arranged to display the control state of the preceding vehicle following cruise control system and the cruising state of the host vehicle. The speaker 15 is configured and arranged to send a voice signal to announce the control state of the preceding vehicle following cruise control system and the cruising state of the host vehicle to the driver.

In the first embodiment of the present invention, the cruise control controller 10 is configured to shift to the preceding vehicle following cruise control in the low speed following cruise control mode unconditionally when the speed of the host vehicle falls to 40 km/h or less while the preceding vehicle following cruise control is executed in the high speed following cruise control mode. However, the cruise control controller 10 is not configured to shift unconditionally to the preceding vehicle following cruise control in the high speed following cruise control mode when the speed of the host vehicle rises to 40 km/h or higher while the preceding vehicle following cruise control is executed in the low speed following cruise control mode. In the latter case, the cruise control controller 10 will not shift automatically unless the cruising speed setting for the high speed following cruise control mode is stored in a prescribed address of the RAM 10c.

In the first embodiment, the cruising speed setting for the high speed following cruise control mode can be set or changed even when the host vehicle is traveling in a vehicle speed region other than the high speed region, i.e., outside the vehicle speed region established for the high speed following cruise control. For example, the cruising speed setting for the high speed following cruise control mode can be set or changed while the host vehicle is stopped or operating in the low speed following cruise control mode. If the cruising speed setting for the high speed following cruise control is set while the host vehicle is in a mode other than the high speed following cruise control mode, then the cruise control controller 10 is configured to shift automatically to the high speed following cruise control mode without any switches (e.g., the resume/accelerate switch 4 or the set/coast switch 6) being operated when the speed of the host vehicle exceeds 40 km/h while the preceding vehicle following cruise control is executed in the low speed following cruise control mode. In such case, for example, if the host vehicle follows a preceding vehicle in the low speed following cruise control mode and the preceding vehicle accelerates beyond the upper speed limit (40 km/h) of the low speed region (i.e., the vehicle speed region in which the low speed following cruise control mode can be used), the cruise control controller 10 of the host vehicle is configured to automatically shift to the high speed following cruise control mode without operating the switches (e.g., the resume/accelerate switch 4 or the set/coast switch 6) and to continue the following cruise control in which the host vehicle follows the preceding vehicle.

Moreover, the cruising speed setting for the high speed following cruise control mode can also be set when the vehicle speed is in neither the high speed region nor the low speed region (i.e., the vehicle speed falls outside of a range of speeds at which the preceding vehicle following cruise control is executed) and when the preceding vehicle following cruise control is not being executed. As a result, when the host vehicle is traveling in the high speed region, the following cruise control that is executed in the high speed following cruise control mode and uses the cruising speed setting can be started immediately by operating the set/coast switch 6 just once. Also, if an independent button specifically for setting the cruising speed setting is provided, the cruising speed setting can be set regardless of the vehicle speed (i.e., at any vehicle speed) when the preceding vehicle following cruise control is not being executed.

The operation of the vehicle cruise control system in accordance with the first embodiment will now be described with reference to the flowchart of FIG. 2. The flowchart of FIG. 2 describes a control process executed in the cruise control controller 10 for setting the cruising speed setting for the high speed following cruise control mode in accordance with the first embodiment.

Figure 2:
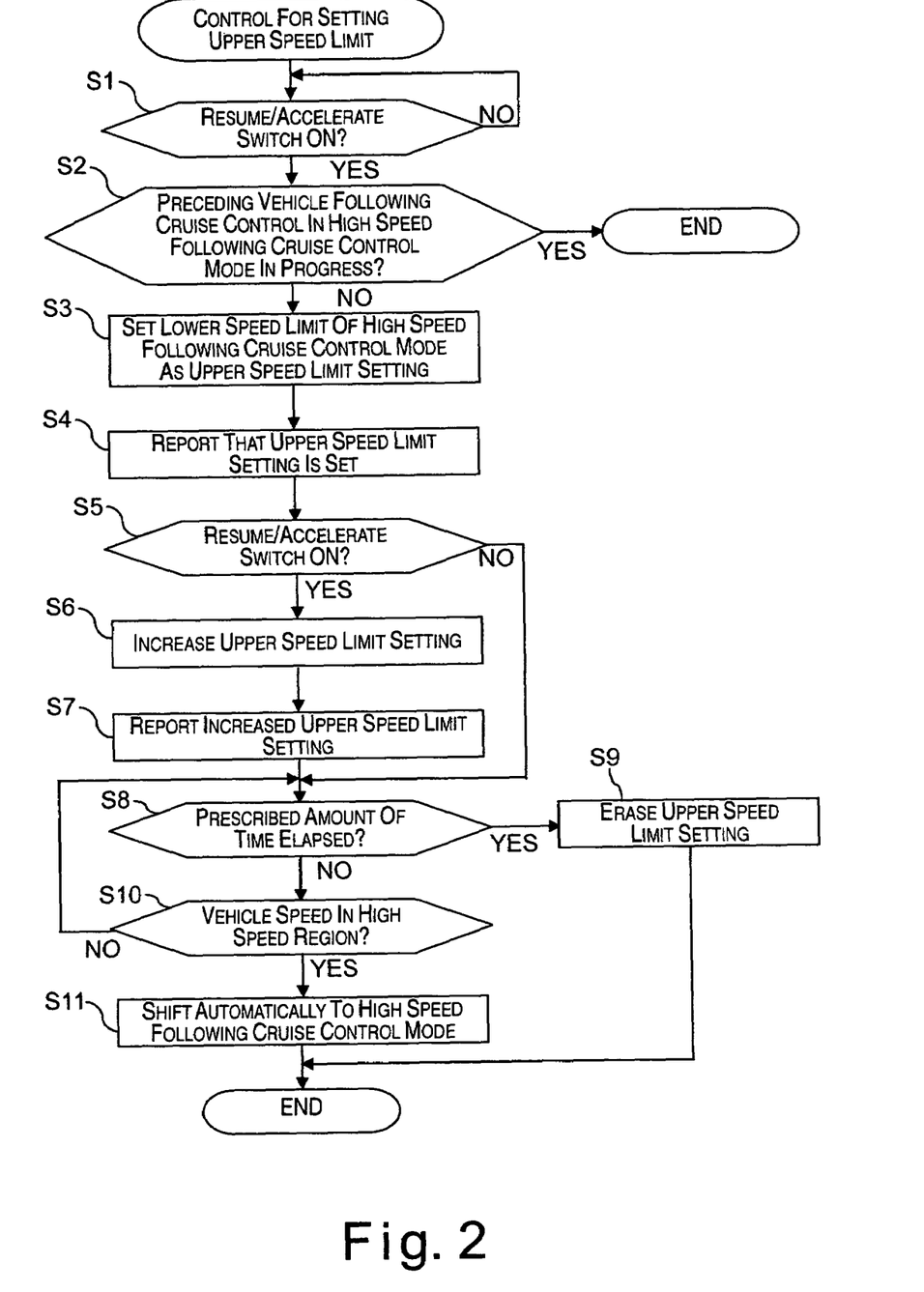
FIG. 2 is a flowchart describing a control process executed in the vehicle cruise control system for setting a cruising speed setting used in a high speed following cruise control mode in accordance with the first embodiment of the present invention.

In step S1 of FIG. 2, the cruise control controller 10 is configured to check if the resume/accelerate switch 4 has been operated. If the resume/accelerate switch 4 is on in step S1, the cruise control controller 10 is configured to proceed to step S2. In step S2, the cruise control controller 10 is configured to check if the preceding vehicle following cruise control is currently being executed in the high speed following cruise control mode. If the preceding vehicle following cruise control is in progress in the high speed following cruise control mode, the cruise control controller 10 is configured to end the control sequence. If the vehicle cruise control system is not in the high speed following cruise control mode, the cruise control controller 10 is configured to proceed to step S3. In step S3, the cruise control controller 10 is configured to set the lower speed limit (40 km/h in the first embodiment) of the high speed cruise control mode as the cruising speed setting for the high speed cruise control mode, and store the cruising speed setting in the prescribed address of the RAM 10c. Then, in step S4, the cruise control controller 10 is configured to send a signal to the display unit 14 to report to the driver that the cruising speed setting for the high speed following cruise control mode has been set.

Figure 3:
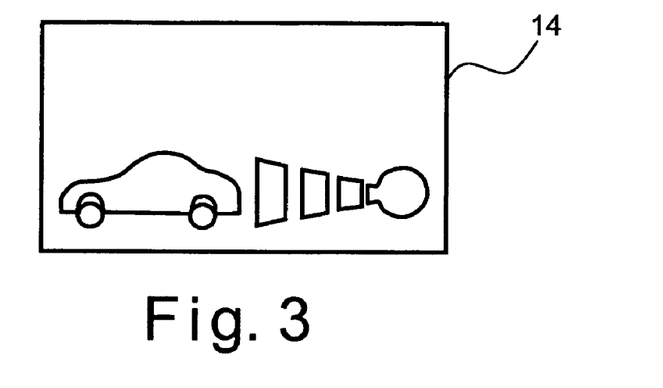
FIG. 3 is a schematic diagram illustrating an example of an image displayed in a display unit of the vehicle cruise control system during a following cruise control in a low speed preceding vehicle following cruise control mode in accordance with the first embodiment of the present invention.
Figure 4:
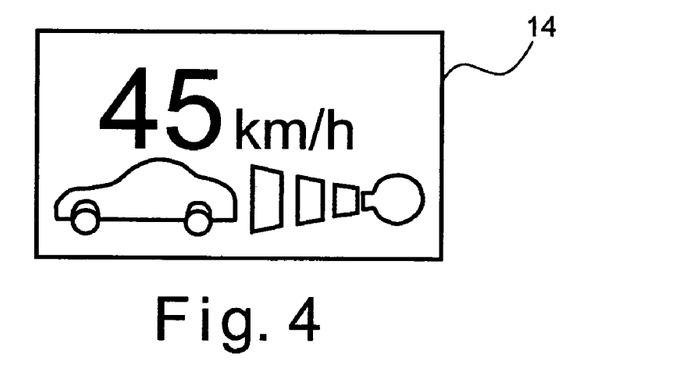
FIG. 4 is a schematic diagram illustrating an example of an image displayed in the display unit of the vehicle cruise control system when the cruising speed setting is displayed in accordance with the first embodiment of the present invention.
Figure 5:
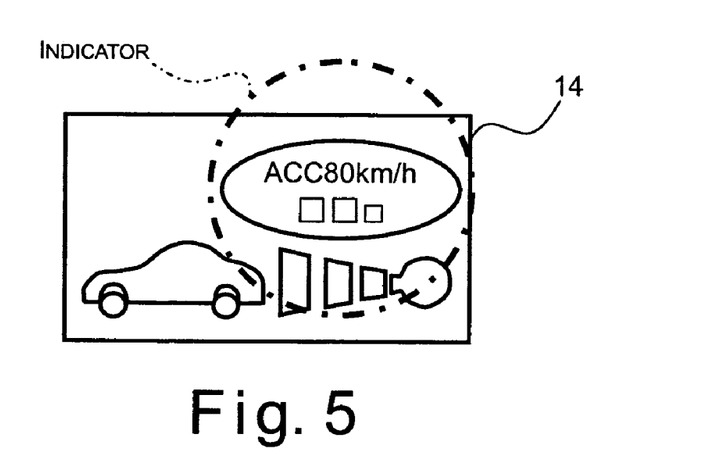
FIG. 5 is a schematic diagram illustrating an example of an image displayed in the display unit of the vehicle cruise control system when the vehicle cruise control system is prepared to shift automatically to a high speed following cruise control mode in accordance with the first embodiment of the present invention.

FIGS. 3 to 5 show schematic diagrams of examples of images displayed in the display unit 14 illustrating how the cruise control state and the setting state of the preceding vehicle following cruise control are indicated on the display unit 14. When the following cruise control is in progress in the low speed following cruise control mode, the display unit 14 is configured to display an image like that shown in FIG. 3. When the following cruise control is in progress in the low speed following cruise control mode and operations are being performed to set the cruising speed setting for the high speed cruise control mode, the cruising speed setting is displayed as shown in FIG. 4 for a prescribed amount of time (e.g., two seconds). After the prescribed amount of time elapses, the display unit 14 is configured to display an indicator like that shown in FIG. 5 to indicate that the cruising speed setting for the high speed following cruise control mode is set and the vehicle cruise control system is ready to shift automatically to the high speed following cruise control mode at any time. It is also acceptable to configure the vehicle cruise control system such that the cruise control state, the setting state of the cruising speed setting, and the fact that the system is ready to shift automatically to the high speed following cruise control mode are announced over the speaker 15.

In step S5, the cruise control controller 10 is again configured to check if the resume/accelerate switch 4 has been operated. If the resume/accelerate switch 4 is on, the controller proceeds to step S6. If the resume/accelerate switch 4 is off, the cruise control controller 10 is configured to proceed to step 8. If the resume/accelerate switch 4 has been operated again in step S6, the cruising speed setting for the high speed following cruise control mode is increased. At this time, if the resume/accelerate switch 4 is operated intermittently, the cruising speed setting is increased 5 km/h each time. If the resume/accelerate switch 4 is operated in a continuous manner, the cruising speed setting is increased 5 km/h every two seconds. In step S7, the updated (increased) cruising speed setting is displayed on the display unit 14 as shown in FIG. 4 and announced over the speaker 15.

In step S8, the cruise control controller 10 is configured to determine if a prescribed amount of time (e.g., five minutes) has elapsed since the cruising speed setting for the high speed following cruise control mode was set. If the prescribed amount of time has elapsed since the cruising speed setting was set, the cruise control controller 10 is configured to proceed to step S9. In step S9, the cruise control controller 10 is configured to erase the cruising speed setting from the prescribed address of the RAM 10c because the driver has likely forgotten that he or she set the cruising speed setting and it would not be desirable to automatically shift to the high speed following cruise control mode under such circumstances. In short, in step S9 the preparation to automatically shift to the high speed following cruise control mode is canceled. When the preparation is canceled, the cruising speed setting indicator displayed on the display unit 14 as shown in FIG. 5 disappears and the display on the display unit 14 returns to the state shown in FIG. 3.

On the other hand, if the prescribed amount of time has not yet elapsed since the cruising speed setting was set in step S8, the cruise control controller 10 is configured to proceed to step S10. In step S10, the cruise control controller 10 is configured to check if the current vehicle speed detected by the vehicle speed sensor 2 is in the high speed region (over 40 km/h in the first embodiment). If the vehicle speed is not yet in the high speed region, the cruise control controller 10 is configured to return to step S8 while continuing the following cruise control in the low speed following cruise control mode. On the other hand, if the vehicle speed is in the high speed region in step S10, the cruise control controller 10 is configured to proceed to step S11 and to automatically shift to the high speed following cruise control mode.

Accordingly, the cruising speed setting for the high speed following cruise control mode can be set or changed even when the system is not executing in the high speed following cruise control mode. Thus, if the host vehicle follows a preceding vehicle in the low speed following cruise control mode, and if the preceding vehicle accelerates beyond the low speed region (i.e., the vehicle speed region in which the low speed following cruise control mode can be used) of the host vehicle, the host vehicle will automatically shift to the high speed following cruise control mode and continue following the preceding vehicle without the driver performing any switch operations. Also, if the cruising speed setting for the high speed following cruise control mode is set in advance while the following cruise control is not being executed, then when the vehicle enters the high speed region, the following cruise control that is executed in the high speed following cruise control mode and uses the cruising speed setting can be started immediately by operating the set/coast switch 6 just once.

Therefore, with the vehicle cruise control system in accordance with the first embodiment of the present invention, the cruising speed setting to be used during the preceding vehicle following cruise control and the constant speed cruise control in the high speed region can be set in advance before the host vehicle actually enters the high speed region. As a result, the operations required to shift to the high speed following cruise control mode can be simplified.

Second Embodiment

Figure 6:
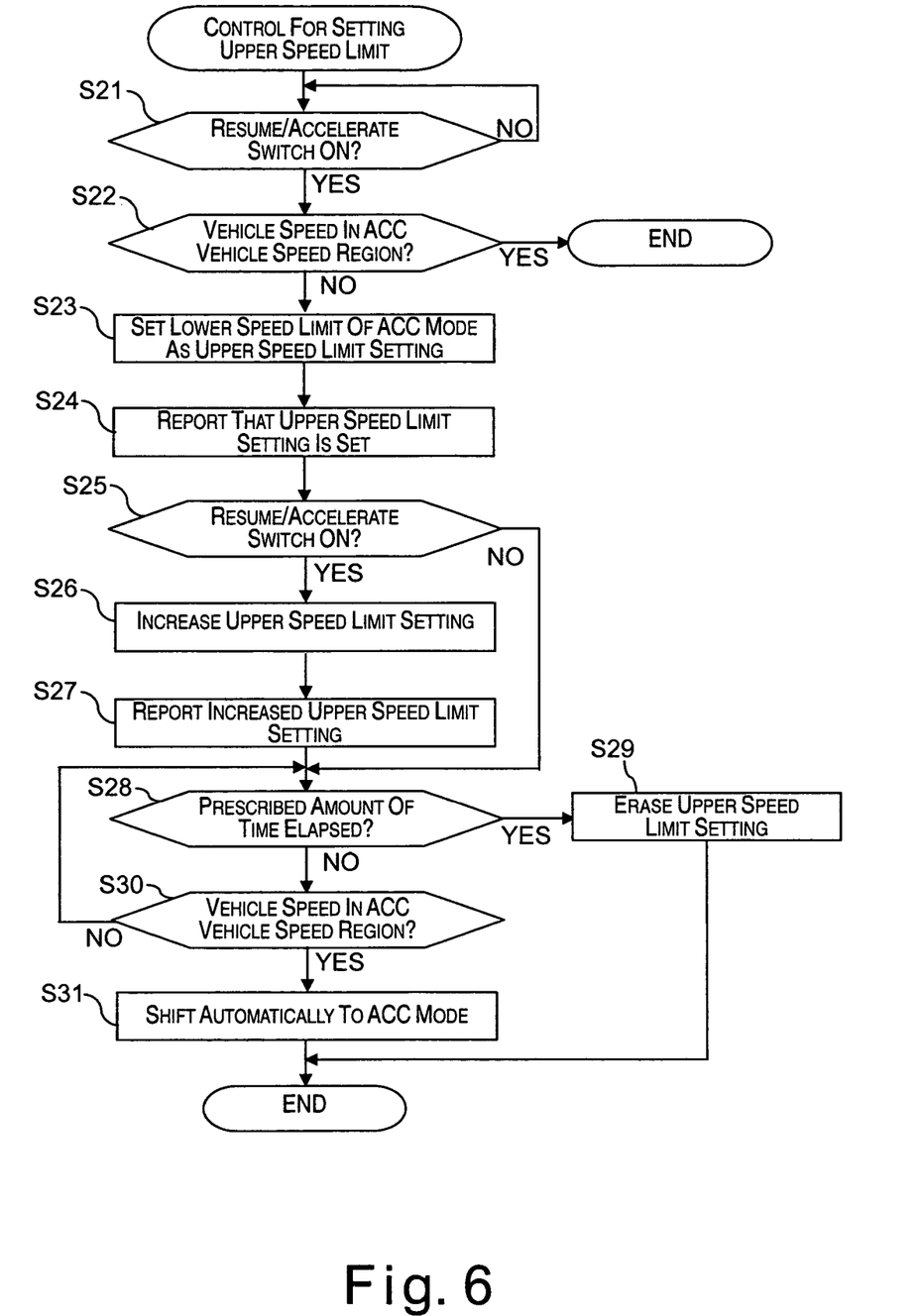
FIG. 6 is a flowchart illustrating a control process executed in a vehicle cruise control system for setting a cruising speed setting used in a high speed following cruise control mode in accordance with a second embodiment of the present invention.

Referring now to FIG. 6, a vehicle cruise control system in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The vehicle cruise control system in the second embodiment differs from the vehicle cruise control system of the first embodiment in that the preceding vehicle following cruise control is executed only in a prescribed vehicle speed region in the second embodiment while the vehicle cruise control system of the first embodiment was configured to execute the preceding vehicle following control in the total range of vehicle speeds and a unique preceding vehicle following cruise control was executed in each vehicle speed region. More specifically, in the second embodiment, the vehicle cruise control system is configured to have only the high speed following cruise control mode (ACC following cruise control mode or ACC mode). In the second embodiment, when the vehicle is traveling in the prescribed vehicle speed region (hereinafter referred as "the ACC vehicle speed region"), the vehicle cruise control system is configured to execute the preceding vehicle following cruise control in which one of a constant speed cruise control and a following cruise control is selectively executed depending on whether a preceding vehicle is detected in front of the host vehicle. In other words, the vehicle cruise control system is configured to execute the constant speed cruise control such that the host vehicle travels in a constant-speed state at a cruising speed setting (hereinafter referred as "cruising speed setting") when a preceding vehicle is not detected and to execute the following cruise control such that the host vehicle follows the preceding vehicle while maintaining a following distance and not exceeding the cruising speed setting when the preceding vehicle is detected. In the second embodiment of the present invention, the ACC vehicle speed region is preferably set to range from 40 km/h to 110 km/h.

The constituent components of the second embodiment are the same as those of the first embodiment shown in FIG. 1 and descriptions thereof are thus omitted for the sake of brevity.

The operation of the second embodiment will now be described with reference to the flowchart of FIG. 6. FIG. 6 is the flowchart showing a control process executed in the cruise control controller 10 for setting the cruising speed setting for the high speed following cruise control mode in the ACC vehicle speed region in accordance with the second embodiment.

In step S21 of FIG. 6, the cruise control controller 10 is configured to check if the resume/accelerate switch 4 has been operated. If the resume/accelerate switch 4 is on in step S21, the cruise control controller 10 is configured to proceed to step S22. In step S22, the cruise control controller 10 is configured to check if the vehicle speed detected by the vehicle speed sensor 2 is in the ACC vehicle speed region (i.e., in the range between 40 and 110 km/h in the second embodiment). If the current vehicle speed is in the ACC vehicle speed region in step S22, the cruise control controller 10 is configured to end the control sequence. If the current vehicle speed is not in the ACC vehicle speed region in step S22, the cruise control controller 10 is configured to proceed to step S23. In step S23, the cruise control controller 10 is configured to set the lower speed limit (i.e., 40 km/h in the second embodiment) of the ACC mode as the cruising speed setting, and to store the cruising speed setting in a prescribed address of the RAM 10c. Then, in step S24, the cruise control controller 10 is configured to report or inform to the driver that the cruising speed setting for the ACC mode has been set.

In step S25, the cruise control controller 10 is again configured to check if the resume/accelerate switch 4 has been operated. If the resume/accelerate switch 4 is on in step S25, the cruise control controller 10 is configured to proceed to step S26. If the resume/accelerate switch 4 is off in step S25, the cruise control controller 10 is configured to proceed to step S28. If the resume/accelerate switch 4 has been operated again in step S25, the cruising speed setting for the ACC mode is increased in step S26. At this time, if the resume/accelerate switch 4 is operated intermittently, the cruising speed setting is increased 5 km/h each time. If the resume/accelerate switch 4 is operated in a continuous manner, the cruising speed setting is increased 5 km/h every two seconds. In step S27, the control unit 10 is configured to report to the driver the updated (increased) value of the cruising speed setting and display an indicator on the display unit 14 (as shown in FIG. 5) to indicate that the cruising speed setting for the ACC mode is set and the vehicle cruise control system is ready to shift automatically to the ACC mode at any time.

In step S28, the cruise control controller 10 is configured to determine if a prescribed amount of time (e.g., five minutes) has elapsed since the cruising speed setting for the ACC mode was set. If the prescribed amount of time has elapsed since the cruising speed setting was set in step S28, the cruise control controller 10 is configured to proceed to step S29 and to erase the cruising speed setting from the RAM 10c because the driver has likely forgotten that he or she set the cruising speed setting and it would not be desirable to automatically shift to the ACC mode under such circumstances. In short, in step S29 the preparation to automatically shift to the ACC mode is canceled. When the preparation is canceled, the indicator displayed on the display unit 14 to indicate that the vehicle cruise control system is ready to shift automatically to the ACC mode (as shown in FIG. 5) disappears.

On the other hand, if the prescribed amount of time has not yet elapsed since the cruising speed setting was set in step S28, the cruise control controller 10 is configured to proceed to step 30 and to check if the current vehicle speed detected by the vehicle speed sensor 2 is in the ACC vehicle speed region (i.e., over 40 km/h in the second embodiment). If the vehicle speed is not yet in the ACC vehicle speed region in step S30, the cruise control controller 10 is configured to return to step S28. On the other hand, if the vehicle speed is in the ACC vehicle speed region in step S30, the cruise control controller 10 is configured to proceed to step S31 and automatically shifts to the preceding vehicle following cruise control in the ACC mode.

In this way, the cruising speed setting for the ACC mode can be set or changed even when the host vehicle is not traveling in the ACC vehicle speed region. Thus, if the host vehicle moves from a low speed state into the ACC vehicle speed region, the vehicle cruise control system can shift into the ACC mode automatically and commence adaptive cruise control without the driver performing any switch operations.

Third Embodiment

Figure 7:
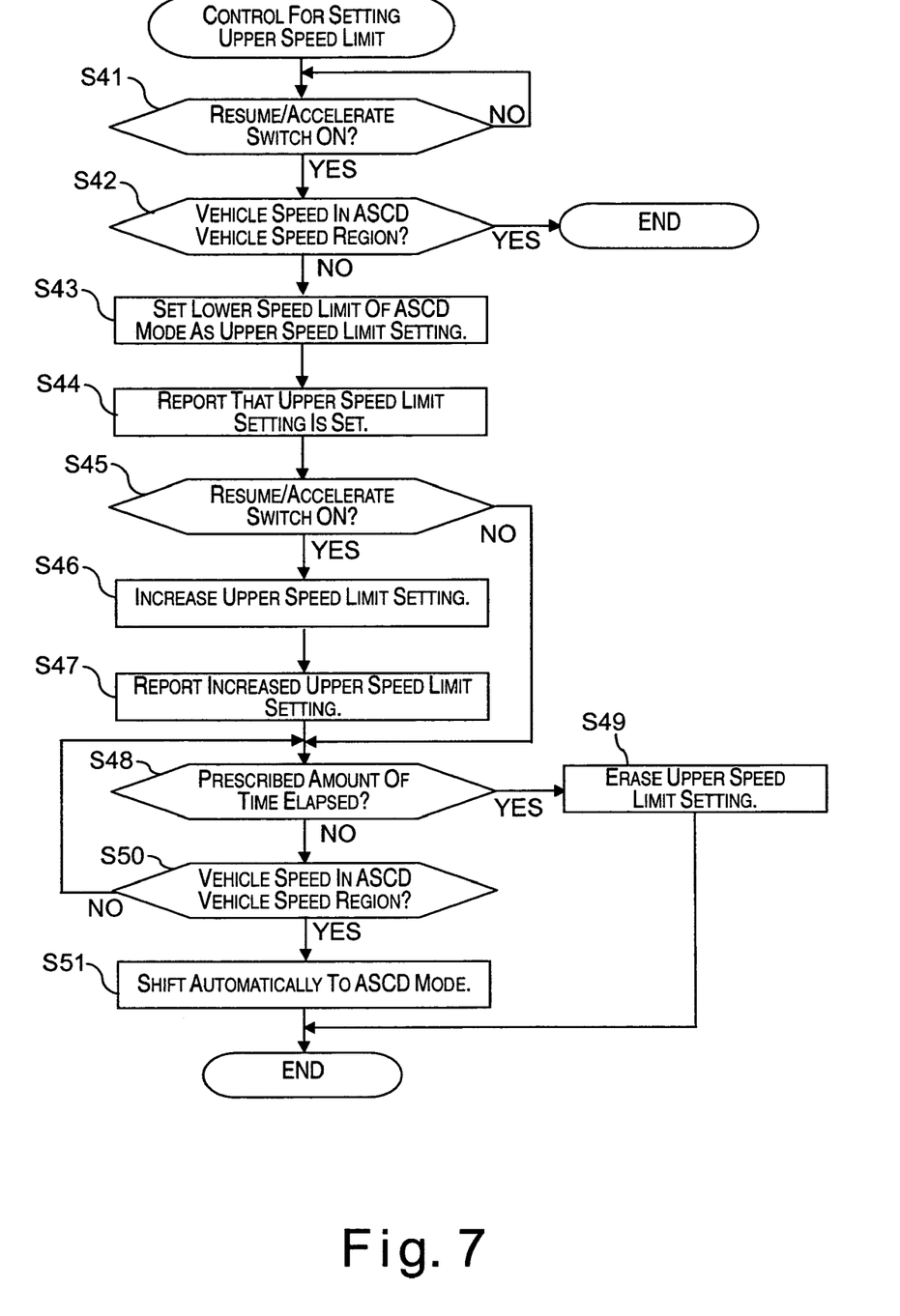
FIG. 7 is a flowchart illustrating a control process executed in a vehicle cruise control system for setting a cruising speed setting used in a prescribed vehicle speed range in accordance with a third embodiment of the present invention.

Referring now to FIG. 7, a vehicle cruise control system in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

The vehicle cruise control system of the third embodiment differs from the vehicle cruise control system of the first embodiment in that the vehicle cruise control system of the third embodiment is arranged as an ASCD (auto speed control device) that is configured to execute a constant speed cruise control such that the host vehicle travels in a constant-speed state at a cruising speed setting (hereinafter called "cruising speed setting") in an ASCD mode regardless of whether or not a preceding vehicle is detected. In the third embodiment of the present invention, the ASCD mode is executed in an ASCD speed region, and the ASCD speed region is preferably set to range from 40 km/h to 110 km/h.

The constituent components of the third embodiment are the same as those of the first embodiment shown in FIG. 1 and descriptions thereof are thus omitted for the sake of brevity. The only difference between the structure of the first embodiment and the structure of the third embodiment is that the vehicle cruise control system of the third embodiment does not require the following distance radar 1.

The operation of the vehicle cruise control system of the third embodiment will now be described with reference to the flowchart of FIG. 7. FIG. 7 is the flowchart showing a control process executed in the cruise control controller 10 for setting the cruising speed setting for the ASCD mode in accordance with the third embodiment.

In step S41, the cruise control controller 10 is configured to check if the resume/accelerate switch 4 has been operated. If the resume/accelerate switch 4 is on in step S41, the cruise control controller 10 is configured to proceed to step S42. In step S42, the cruise control controller 10 is configured to check if the vehicle speed detected by the vehicle speed sensor 2 is in the ASCD vehicle speed region (i.e., in the range of 40 to 110 km/h in the third embodiment). If the current vehicle speed is in the ASCD vehicle speed region in step S42, the cruise control controller 10 is configured to end the control sequence. If the current vehicle speed is not in the ASCD vehicle speed region in step S42, the cruise control controller 10 is configured to proceed to step S43. In step S43, the cruise control controller 10 is configured to set the lower speed limit (i.e., 40 km/h in the third embodiment) of the ASCD mode as the cruising speed setting, and to store the cruising speed setting in a prescribed address of the RAM 10c. Then, in step S44, the cruise control controller 10 is configured to report to the driver that the cruising speed setting for the ASCD mode has been set.

In step S45, the cruise control controller 10 is again configured to check if the resume/accelerate switch 4 has been operated. If the resume/accelerate switch 4 is on in step S45, the cruise control controller 10 is configured to proceed to step S46. If the resume/accelerate switch 4 is off in step S45, the cruise control controller 10 is configured to proceed to step S48. If the resume/accelerate switch 4 has been operated again in step S45, in step S46 the cruising speed setting for the ASCD mode is increased. At this time, if the resume/accelerate switch 4 is operated intermittently, the cruising speed setting is increased 5 km/h each time. If the resume/accelerate switch 4 is operated in a continuous manner, the cruising speed setting is increased 5 km/h every two seconds. In step S47, the cruise control controller 10 is configured to report to the driver the updated (increased) value of the cruising speed setting and to display an indicator on the display unit 14 to indicate that the cruising speed setting for the ASCD mode is set and the system is ready to shift automatically to the ASCD mode at any time.

In step S48, the cruise control controller 10 is configured to determine if a prescribed amount of time (e.g., five minutes) has elapsed since the cruising speed setting for the ASCD mode was set. If the prescribed amount of time has elapsed since the cruising speed setting was set in step S48, the cruise control controller 10 is configured to proceed to step S49 and to erase the cruising speed setting from the RAM 10c because the driver has likely forgotten that he or she set the cruising speed setting and it would not be desirable to automatically shift to the ASCD mode under such circumstances. In short, in step S49 the preparation to automatically shift to the ASCD mode is canceled. When the preparation is canceled, the indicator displayed on the display unit 14 to indicate that the vehicle cruise control system is ready to shift automatically to the ASCD mode disappears.

On the other hand, if the prescribed amount of time has not yet elapsed since the cruising speed setting was set in step S48, the cruise control controller 10 is configured to proceed to step S50 and to check if the current vehicle speed detected by the vehicle speed sensor 2 is in the ASCD vehicle speed region (i.e., over 40 km/h in the third embodiment). If the vehicle speed is not yet in the ASCD vehicle speed region in step S50, the cruise control controller 10 is configured to return to step S48. On the other hand, if the vehicle speed is in the ASCD speed region in step S50, the cruise control controller 10 is configured to proceed to step S51 and to automatically shift to the constant speed cruise control in the ASCD mode.

In this way, the cruising speed setting for the ASCD mode can be set or changed even when the vehicle is not traveling in the ASCD vehicle speed region. Thus, if the vehicle moves from a low speed state into the ASCD speed region, the vehicle cruise control system can shift into the ASCD mode automatically and commence the constant speed cruise control without the driver performing any switch operations.

In any of the embodiments described heretofore (first, second, and third embodiments), it is also acceptable to provide an independent button specifically for setting the cruising speed setting instead of using the resume/accelerate switch 4.

In the above explained embodiments, the following distance radar 1 preferably corresponds to the following distance detecting section of the present invention. The vehicle speed sensor 2 preferably corresponds to the vehicle speed detecting section of the present invention. The cruise control controller 10 preferably corresponds to the cruise control section, the cruising speed setting section, and the cruising speed setting canceling section of the present invention. The display unit 14 and the speaker 15 preferably correspond to the reporting section of the present invention. The constituent elements of the present invention are not limited to those described herein so long as the characteristic functions of these elements of the present invention are not lost.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function. Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle cruise control system comprising:
a vehicle speed detecting section configured and arranged to detect a speed of a host vehicle;
a cruise control section configured to execute a first prescribed cruise control such that the host vehicle travels in a constant-speed state at a cruising speed setting for a first prescribed speed region when the vehicle speed detecting section detects the host vehicle is traveling at a speed in the first prescribed speed region; and
a cruising speed setting section configured to set the cruising speed setting for the first prescribed speed region while the vehicle speed detecting section detects the host vehicle is traveling at a speed in a vehicle speed region other than the first prescribed speed region such that the cruising speed setting for the first prescribed speed region is set in advance of the speed of the host vehicle being detected as entering the first prescribed speed region.

2. The vehicle cruise control system as recited in claim 1, further comprising
a following distance detecting section configured and arranged to detect a preceding vehicle in front of the host vehicle and to detect a following distance from the host vehicle to the preceding vehicle,
the cruise control section being further configured to execute the first prescribed cruise control such that the host vehicle travels in the constant-speed state at the cruising speed setting when the preceding vehicle is not detected in front of the host vehicle and the host vehicle follows the preceding vehicle while maintaining a first prescribed following distance and not exceeding the cruising speed setting when the preceding vehicle is detected in front of the host vehicle when the host vehicle is traveling in the first prescribed speed region.

3. The vehicle cruise control system as recited in claim 2, wherein
the cruise control section is further configured to execute a second prescribed cruise control such that the host vehicle follows the preceding vehicle while maintaining a second prescribed following distance when the preceding vehicle is detected in front of the host vehicle when the host vehicle is traveling in a second prescribed speed region with a speed range that is at least partially lower than a speed range of the first prescribed speed region.

4. The vehicle cruise control system as recited in claim 3, wherein
the cruise control section is further configured to execute a preceding vehicle following cruise control in a total range of vehicle speeds of the host vehicle that includes at least the first and second speed regions.

5. The vehicle cruise control system as recited in claim 3, wherein
the cruise control section is configured to automatically start the first prescribed cruise control when a speed of the host vehicle reaches the first speed region and when the cruising speed setting has been set by the cruising speed setting section.

6. The vehicle cruise control system as recited in claim 3, further comprising
a cruising speed setting canceling section configured to cancel the cruising speed setting when a prescribed amount of time has elapsed since the cruising speed setting was set by the cruising speed setting section.

7. The vehicle cruise control system as recited in claim 3, further comprising
a reporting section configured and arranged to report to a driver of the host vehicle that the cruising speed setting has been set with the cruising speed setting section.

8. The vehicle cruise control system as recited in claim 3, further comprising
a reporting section configured and arranged to issue a first report indicating a currently selected value of the cruising speed setting when the cruising speed setting is being set with the cruising speed setting section and a second report that is different from the first report and issued after the cruising speed setting has been set with the cruising speed setting section, the second report indicating that the prescribed first cruise control using the cruising speed setting set with the cruising speed setting section is ready to start.

9. The vehicle cruise control system as recited in claim 2, wherein
the cruise control section is configured to automatically start the first prescribed cruise control when a speed of the host vehicle reaches the first speed region and when the cruising speed setting has been set by the cruising speed setting section.

10. The vehicle cruise control system as recited in claim 2, further comprising
a cruising speed setting canceling section configured to cancel the cruising speed setting when a prescribed amount of time has elapsed since the cruising speed setting was set by the cruising speed setting section.

11. The vehicle cruise control system as recited in claim 2, further comprising
a reporting section configured and arranged to report to a driver of the host vehicle that the cruising speed setting has been set with the cruising speed setting section.

12. The vehicle cruise control system as recited in claim 2, further comprising
a reporting section configured and arranged to issue a first report indicating a currently selected value of the cruising speed setting when the cruising speed setting is being set with the cruising speed setting section and a second report that is different from the first report and issued after the cruising speed setting has been set with the cruising speed setting section, the second report indicating that the prescribed first cruise control using the cruising speed setting set with the cruising speed setting section is ready to start.

13. The vehicle cruise control system as recited in claim 1, wherein
the cruise control section is configured to automatically start the first prescribed cruise control when a speed of the host vehicle reaches the first speed region and when the cruising speed setting has been set by the cruising speed setting section.

14. The vehicle cruise control system as recited in claim 1, further comprising a cruising speed setting canceling section configured to cancel the cruising speed setting when a prescribed amount of time has elapsed since the cruising speed setting was set by the cruising speed setting section.

15. The vehicle cruise control system as recited in claim 1, further comprising a reporting section configured and arranged to report to a driver of the host vehicle that the cruising speed setting has been set with the cruising speed setting section.

16. The vehicle cruise control system as recited in claim 1, further comprising a reporting section configured and arranged to issue a first report indicating a currently selected value of the cruising speed setting when the cruising speed setting is being set with the cruising speed setting section and a second report that is different from the first report and issued after the cruising speed setting has been set with the cruising speed setting section, the second report indicating that the prescribed first cruise control using the cruising speed setting set with the cruising speed setting section is ready to start.

17. A vehicle cruise control method comprising:

detecting a speed of a host vehicle;

executing a first prescribed cruise control such that the host vehicle travels in a constant-speed state at a cruising speed setting for a first prescribed speed region when the detecting the speed of the host vehicle detects the host vehicle is traveling at a speed in the first prescribed speed region; and setting the cruising speed setting for the first prescribed speed region while the detecting the speed of the host vehicle detects the host vehicle is traveling at a speed in a vehicle speed region other than the first prescribed speed region such that the cruising speed setting for the first prescribed speed region is set in advance of the speed of the host vehicle being detected as entering the first prescribed speed region.

18. The vehicle cruise control method as recited in claim 17, further comprising detecting a preceding vehicle in front of the host vehicle and a following distance from the host vehicle to the preceding vehicle, executing the first prescribed cruise control such that the host vehicle travels in the constant-speed state at the cruising speed setting when the preceding vehicle is not detected in front of the host vehicle and the host vehicle follows the preceding vehicle while maintaining a first prescribed following distance and not exceeding the cruising speed setting when the preceding vehicle is detected in front of the host vehicle when the host vehicle is traveling in the first prescribed speed region.

19. The vehicle cruise control method as recited in claim 18, further comprising executing a second prescribed cruise control such that the host vehicle follows the preceding vehicle while maintaining a second prescribed following distance when the preceding vehicle is detected in front of the host vehicle when the host vehicle is traveling in a second prescribed speed region with a speed range that is lower than a speed range of the first prescribed speed region.

20. A vehicle cruise control system comprising:

vehicle speed detecting means for detecting a speed of a host vehicle;

cruise control means for executing a first prescribed cruise control such that the host vehicle travels in a constant-speed state at a cruising speed setting for a first prescribed speed region when the vehicle speed detecting means detects the host vehicle is traveling at a speed in the first prescribed speed region; and cruising speed setting means for setting the cruising speed setting for the first prescribed speed region while the vehicle speed detecting means detects the host vehicle is traveling at a speed in a vehicle speed region other than the first prescribed speed region such that the cruising speed setting for the first prescribed speed region is set in advance of the speed of the host vehicle being detected as entering the first prescribed speed region.

* * * * *